A. O. HARRIS.
NET FLOAT.
APPLICATION FILED MAY 31, 1918.
1,296,386.
Patented Mar. 4, 1919.
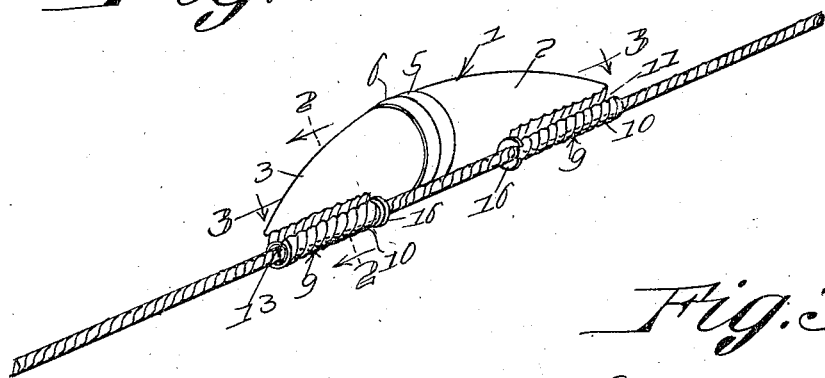
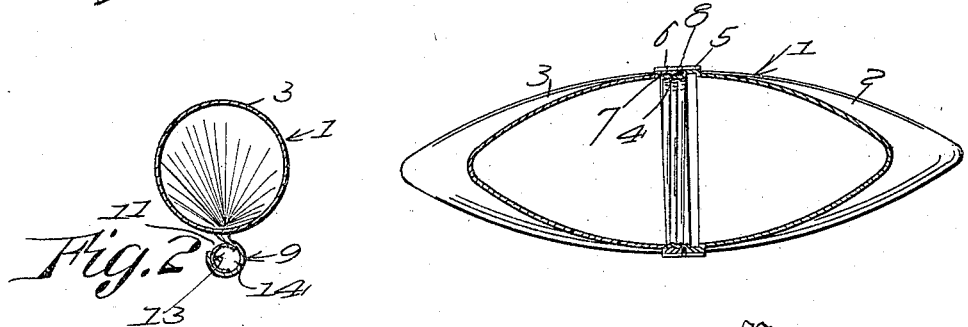
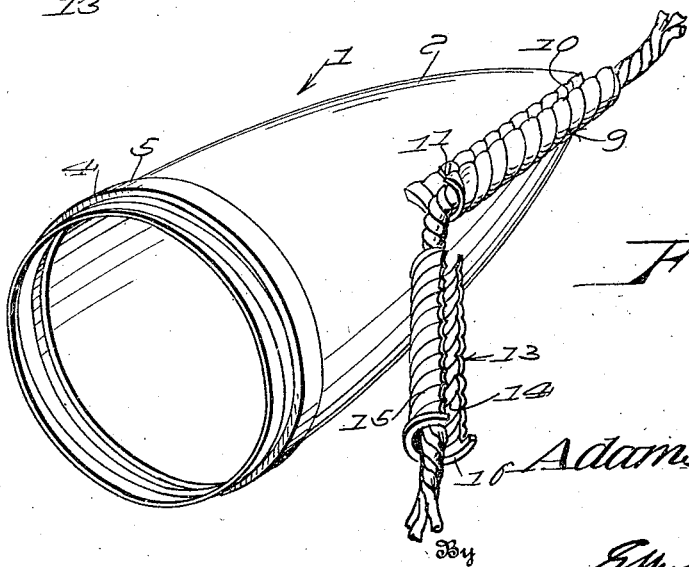
Inventor
Adams O. Harris.

UNITED STATES PATENT OFFICE.

ADAMS O. HARRIS, OF GOBLE, OREGON.

NET-FLOAT.

1,296,386.  Specification of Letters Patent.  Patented Mar. 4, 1919.

Application filed May 31, 1918. Serial No. 237,553.

*To all whom it may concern:*

Be it known that I, ADAMS O. HARRIS, a citizen of the United States of America, residing at Goble, in the county of Columbia and State of Oregon, have invented new and useful Improvements in Net-Floats, of which the following is a specification was filed May 31, 1918, and bears Serial No. 237,553.

The invention relates particularly to floats to be used by fishermen when placing their seine and it has, for its principal object, the provision of a net float which may be readily attached to or detached from the float line.

A second object resides in the provision of a net float made of metal which, therefore, can not become water soaked, as is the case in cork or wood floats.

Still another purpose of the invention contemplates the provision of two sleeve members made an integral part of the float and slotted longitudinally, these sleeve members being designed to receive other detachable sleeve members on the float line and also provided with longitudinal slots, whereby the float may be easily connected to the line and loosely but securely held in connection therewith.

Still another object of the invention is to provide a device of this character which is simple in construction, durable and effective in operation and which may be manufactured at low cost.

Other and further objects will appear as the device is set forth in detail in the description which follows.

To the exact construction in which it is shown and described, the invention is not to be restricted. The actual reduction to practice may make manifest certain desirable changes or alterations and the right is claimed to make any which do not deviate from the scope of the subjoined claims.

In the accompanying drawings:

Figure 1 is a perspective view of the float, showing it attached to a portion of the float line with which the seine is connected when the device is in use.

Fig. 2 is a section on the line 2—2 of Fig. 1.

Fig. 3 is a section on the line 3—3 of Fig. 1.

Fig. 4 is a detail perspective view of a portion of the float which has attached to it one of the open sleeve members, the detachable sleeve member being shown in a position preparatory to insertion in the first sleeve member.

Referring to the drawings, in which the invention is shown, the body 1 comprises the conical shaped sections 2 and 3 which are joined together at their base portions. These conical shaped sections are so formed that the lines defining their height pass through points lying on their curved surfaces. Both the sections 2 and 3 are intended to be made of thin sheet metal such as galvanized iron and may be formed from blanks and pressed into the desired shape, and turned into the desired conical form and finally soldered, threads 4 being pressed into the section 2 terminating its base and the base portion adjoining the threads having a flange 5. The section 3 is so shaped as to provide a flange 6 and the threaded portion 7 beyond the flange, both the flange and the threaded portion being pressed in the metal of which the section is made. The two sections are assembled by having the section 2 screwed on the section 3, the threads 4 of the former engaging the threads 7 of the latter and the rubber gasket 8 being interposed between the flanges 5 and 6 of the two sections which, when screwed firmly together with the gasket 8 between them, become water tight.

When the two sections are screwed together, that portion of the body which is next to the line 1 is designed to be in a straight line perpendicular with the threaded portions of the two sections and on this portion and at either end of the body portion there is a sleeve member 9, these sleeve members being cylindrical in shape and crimped by pressing to form suitable threads 10. At the point where they join the body portion 1, longitudinal openings 11 are formed, these openings being wide enough to permit the insertion of the float line 12 between them so that it may lie within the sleeve members 9. It will be observed the two sleeve members 9 are attached to the body portion 1 of the float, so that their longitudinal openings 11 lie on opposite sides of the float.

Designed for insertion in the sleeve members 9, there are detachable sleeve members 13 which have longitudinal openings 14 and are crimped by pressing to provide the threads 15 and the headed or shoulder portions 16. The openings 14 are large enough to permit the insertion of the float line 12 through them to the interior of the sleeve members 13.

After the sections 2 and 3 have been attached together, the float is attached to the float line first by having its sleeve members engage the line by passing the latter through the longitudinal openings 11. The sleeve members 13 are then connected to the line in the same way after which they are screwed into the sleeve members 9, their head portions 16 abutting the ends of the sleeve members 9 after their longitudinal openings 14 have passed the longitudinal openings 11. Thus the float line is loosely but securely attached to the float and can not be detached therefrom until after the sleeve members 13 are removed from the sleeve members 9, when the detaching is completed by withdrawing the float line 12 through the longitudinal openings of the members 9 and through the longitudinal openings 14 of the members 13.

The invention having been described, what is claimed as new and useful is:

1. A net float comprising a body portion, members connected therewith and having means for attachment to the float line of a net, and detachable members also having means for connection with the float of a net, said detachable members coöperating with the aforesaid members to permit the float line to be attached to or detached from the float line.

2. A net float comprising a body section made of metal and comprising two halves, each hollow on the interior, means conjoined with each section whereby the two may be attached together and secured against leakage of water thereinto, and detachable members also having means for connection with the float of a net, said detachable members coöperating with the aforesaid members to permit the float line to be attached to or detached from the float line.

3. A net float comprising a body section, a sleeve member attached thereto at either end, the sleeve members being provided with threads and longitudinal openings adjacent the body, and detachable sleeve members also provided with threads and longitudinal openings, the detachable sleeve members having heads formed at one end and being designed for threaded engagement with the first said sleeve members, whereby the float may be attached or detached from the float line.

In testimony whereof I affix my signature.

ADAMS O. HARRIS.

Copies of this patent may be obtained for five cents each, by addressing the "Commissioner of Patents, Washington, D. C."